No. 612,607. Patented Oct. 18, 1898.
F. GRAFF.
RAILWAY COUPLING APPARATUS.
(Application filed July 11, 1898.)
(No Model.) 2 Sheets—Sheet 1.
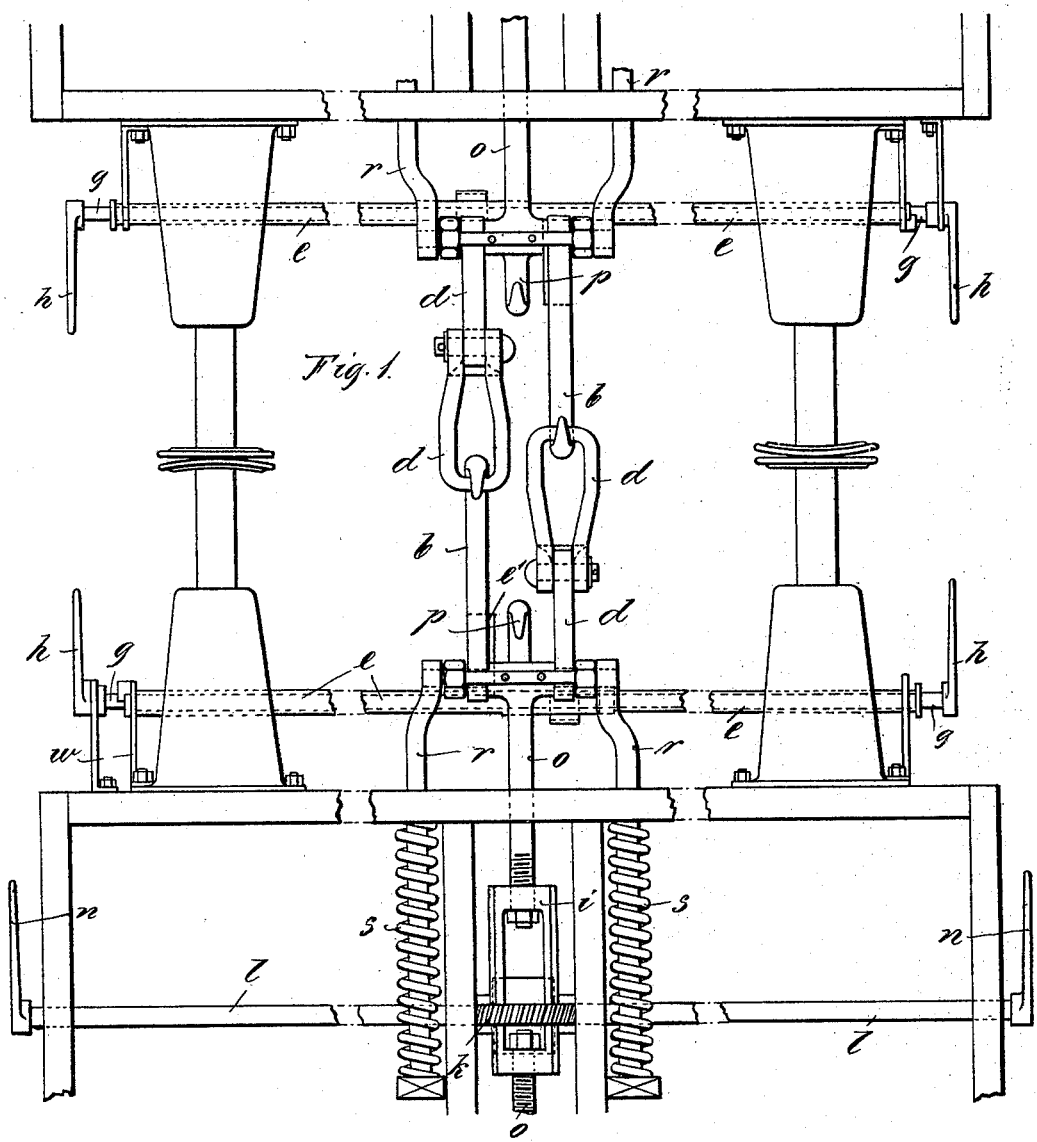
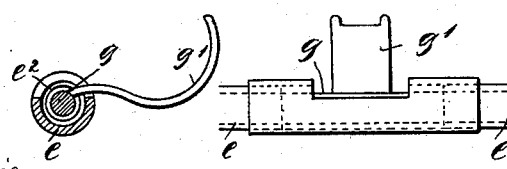
Witnesses:
M. C. Massie.
A. A. Gloetzner.
Inventor:
Friedrich Graff
by Max Thorpe
Attorney.

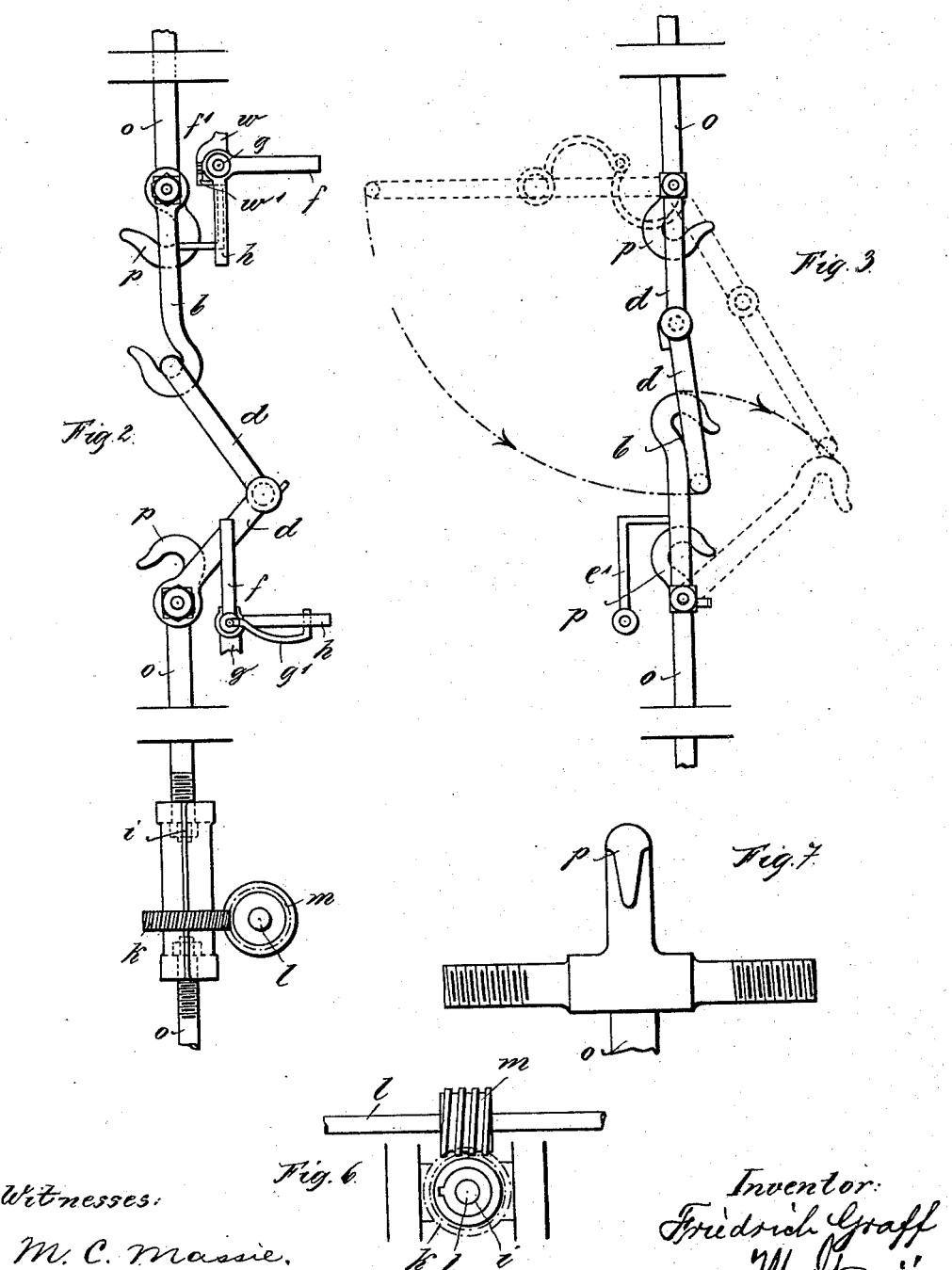

UNITED STATES PATENT OFFICE.

FRIEDRICH GRAFF, OF WITTEN, GERMANY.

RAILWAY COUPLING APPARATUS.

SPECIFICATION forming part of Letters Patent No. 612,607, dated October 18, 1898.

Application filed July 11, 1898. Serial No. 685,667. (No model.)

*To all whom it may concern:*

Be it known that I, FRIEDRICH GRAFF, manufacturer, a subject of the King of Prussia, German Emperor, and a resident of 89 Breitestrasse, Witten-on-the-Ruhr, Kingdom of Prussia, German Empire, have invented a new and useful Improved Coupling Apparatus for Railway-Vehicles, of which the following is an exact specification, and for which patents have been filed in Germany, No. 12,361, April 13, 1898, and in France, No. 265,791, May 17, 1898.

This invention relates to an improved construction of that kind of coupling apparatus for railway-vehicles in which the coupling and uncoupling are effected from the side of the vehicle.

The improved construction possesses, in addition to its great simplicity, the advantage that it can be used together with the ordinary couplings at present in use. The main feature of the coupling consists in that the draw-bar has pivoted to its end both a hook and a loop or shackle side by side, both turning in a vertical plane and which are held below by supports, of which the one for the hook is carried by a hollow shaft that can be shifted longitudinally, while the support for the shackle is fixed to a solid shaft passing through the hollow shaft. Both of these shafts are provided at the side of the vehicle with suitable appliances for actuating them.

In order to make my invention more clear, I refer to the accompanying drawings, in which similar letters denote similar parts throughout the several views, and in which—

Figure 1 shows a plan of the coupling apparatus of two adjacent vehicles in the engaged position. Fig. 2 shows a side view of the right-hand pair of couplings. Fig. 3 shows the left-hand pair of couplings. Figs. 4 to 7 show details.

$b\ b$ are the coupling-hooks, turning in a vertical plane, and $d\ d$ are the loops or shackles to be coupled therewith, which in the construction shown consists of two parts connected together by a hinge-joint, these parts being, however, so arranged that the loops themselves cannot move downward beyond the arms when holding them in the horizontal position, while they are free to move in the upward direction, so that the two parts of each shackle can assume angular positions such as are shown by way of example at Figs. 2 and 3.

The parts $b$ and $d$ are carried by one and the same draw-bar $o$, which has in addition a rigid hook $p$, with which can be engaged an ordinary coupling-chain. Each draw-bar $o$ is coupled by the lateral branches of the hook $p$, Fig. 7, with two guide-bars $r$, which are acted upon in the known manner by helical springs $s$. At a point between these guide-bars $r$ the draw-bar $o$ is divided into two parts, the ends of these parts being formed, respectively, with a right and a left handed screw-thread and screwing into a tightening-yoke $i$, Figs. 1 and 2, so that by turning this yoke in one direction or the other the parts of the draw-bar are either drawn together or moved farther apart. Thus in the first case if the coupling-hook is engaged with the coupling chain or loop of the next vehicle the coupling will be tightened up, and in the second case it will be loosened, so as to be capable of disengagement. For effecting such turning of the tightening-yoke from the side of the vehicle it has combined with it a worm-wheel R, Figs. 1, 2, and 6, in such manner that the wheel carries the yoke around with it; but the yoke can slide longitudinally through the wheel, which is stationary, in the direction of its axis. With the worm-wheel is engaged a worm $m$, fixed on a shaft $l$, extending to either side of the vehicle and provided with hand-levers $n$ outside, by means of which the shaft can be turned so as to effect the rotation of the worm and worm-wheel, and consequently of the adjusting-yoke, in one direction or the other.

The hook $b$ and the shackle $d$ are held in the normal position by supporting-arms $e'$, Fig. 3, and $g'$, Figs. 2, 4, and 5. The support $e'$ serves for holding the hook $b$ and the support $g'$ for holding the shackle $d$. The support $e'$ is fixed on a tubular shaft $e$, that passes underneath the buffers and contains a solid shaft $g$. Near the hook $b$ the tubular shaft $e$ is provided with a lateral slot $e^2$, Fig. 4, through which the support $g'$, fixed on the shaft $g$, projects, the slot $e^2$ being of such length that the hollow shaft $e$ can be shifted relatively to shaft $g$ to such an extent that the support $e'$ is brought from under the hook $b$, so that this loses its support and can consequently swing downward. This action is effected in all cases where a coupling of the above-described improved construction is to be connected to a coupling of the existing kind.

If both vehicles are provided with the improved coupling, the hooks $b$ can be maintained in their horizontal position. This is, however, a case that will not occur for some considerable time, as for some time to come only a portion of the rolling-stock will have the new coupling.

For actuating the shafts $e$ and $g$ from the sides of the vehicle they are provided with hand-levers $f$ and $h$, the levers $h$ serving to raise and lower the support $g'$, while the arms $f$ serve both for raising and lowering the support $e'$ and for moving the shaft $e$ longitudinally. In order that during the normal position of the support $e'$ no unintentional longitudinal motion of the shaft $e$ may occur, at least one of the levers $f$ is provided with a projection $f'$, Fig. 2, which engages behind a beak on a fixed bracket, Figs. 1 and 2, as long as the lever $f$ is in the position at Fig. 2. The hook $b$ will be held by the support $e'$ and no longitudinal motion of the shaft $e$ can take place. When it is required to move it longitudinally, the attendant first turns the lever $f$ which happens to be on his side, so that the engagement of the parts $f$ and $w$ is released, and the hollow shaft $e$ is then shifted longitudinally, so that the support $e'$ is removed from the hook $b$, and thus in losing its support can drop down.

The coupling up of the parts is effected as follows: The uncoupled shackle $d$, being in the hanging-down position, is raised by means of the support $g'$, whose shaft $g$ is turned by lever $h$, such raising being effected above the horizontal position in this motion. It also raises the hook $b$, projecting horizontally over it, as indicated in dotted lines at Fig. 3. The raising of $d$ is continued until the hook $b$ is free of it and can again fall back onto the support $e'$, whereupon the shackle $d$ is lowered again until it engages with the hook $b$. The same operation is then also carried out with the shackle $d$ of the other vehicle, so that both hooks and shackles of the coupling are engaged, after which the tightening-yokes $i$ are screwed up in the above-described manner, so that both sets of hooks and shackles are now tightly coupled up. For uncoupling the operation is carried out in the reverse manner.

Having now described the nature of my invention, what I claim, to be secured by Letters Patent of the United States, is—

1. In a coupling apparatus for railway-vehicles, the combination with a draw-bar, of a hook and a shackle pivoted in said draw-bar and adapted to swing in a vertical plane, and separate supports arranged below the hook and shackle and mounted on separate transverse shafts, whereby each support may be independently operated.

2. In a coupling apparatus for railway-vehicles, the combination with a draw-bar, of a hook and a shackle pivoted side by side on said draw-bar, a tubular transverse shaft having a support for the hook fixed on it and a solid shaft passing through the tubular shaft provided with a support for the shackle.

3. In a coupling apparatus for railway-vehicles, the combination of the draw-bar, a hook and a shackle pivoted side by side to said draw-bar, supports for said hook and shackle, a tubular transverse shaft having the support for the hook fixed to it, a solid shaft passing through the tubular shaft and having the support for the shackle secured to it, and appliances for turning said shafts and located at the sides of the vehicle, for the purpose as described.

In witness whereof I have hereunto set my hand in presence of two witnesses.

FRIEDRICH GRAFF.

Witnesses:
R. E. JAHN,
OTTO KÖNIG.